United States Patent [19]

Villalobos

[11] 4,319,889
[45] Mar. 16, 1982

[54] ULTRASHARP DIAMOND EDGES AND POINTS AND METHODS OF MAKING SAME BY PRECISION MICRO-IRRADIATION TECHNIQUES

[76] Inventor: Humberto F. Villalobos, 55 Dartmouth Rd., Williams Bay, Wis. 53191

[21] Appl. No.: 121,106

[22] Filed: Feb. 13, 1980

Related U.S. Application Data

[63] Continuation-in-part of Ser. No. 63,685, Aug. 6, 1979, which is a continuation of Ser. No. 852,022, Nov. 16, 1977, Pat. No. 4,164,680.

[51] Int. Cl.³ .......................... B24D 3/02; B24D 3/04
[52] U.S. Cl. ........................................ 51/307; 51/293; 51/309; 83/171
[58] Field of Search ................. 51/309, 307, 293, 295; 83/171; 264/101, 102, 162; 34/1

[56] References Cited

U.S. PATENT DOCUMENTS

| | | | |
|---|---|---|---|
| 3,060,781 | 10/1962 | Villalobos | 83/651 |
| 3,091,144 | 5/1963 | Villalobos | 83/15 |
| 3,447,366 | 6/1969 | Villalobos | 73/104 |
| 3,646,841 | 3/1972 | Villalobos | 83/171 |
| 3,751,780 | 8/1973 | Villalobos | 29/95 |
| 3,803,958 | 4/1974 | Moran | 83/15 |
| 4,084,942 | 4/1978 | Villalobos | 51/307 |
| 4,124,690 | 11/1978 | Strong et al. | 423/446 |
| 4,164,680 | 8/1979 | Villalobos | 313/336 |
| 4,174,380 | 11/1979 | Strong et al. | 423/446 |
| 4,181,505 | 1/1980 | DeVries et al. | 51/307 |

*Primary Examiner*—Donald E. Czaja
*Assistant Examiner*—W. Thompson
*Attorney, Agent, or Firm*—Robert E. Burns; Emmanuel J. Lobato; Bruce L. Adams

[57] ABSTRACT

An ultrasharp diamond edge or point, which may be a monocrystalline diamond cut and ground to provide an ultrasharp edge or point or a polycrystalline diamond molded from ultrafine diamond or graphite powder to form an ultrasharp edge or point is irradiated with an electron microbeam and preferably simultaneously is subjected to a controlled jet of highly purified gas in an enclosure at low temperature and low pressure to smooth out any minute irregularities and to obtain an atomic smoothness, glazing and annealing. By selectively masking the surface of the diamond edge or point or facet planes, the effect of the irradiation or jet can be confined to well defined areas.

15 Claims, 6 Drawing Figures

ULTRASHARP DIAMOND EDGES AND POINTS AND METHODS OF MAKING SAME BY PRECISION MICRO-IRRADIATION TECHNIQUES

REFERENCE TO PRIOR APPLICATION

This application is a continuation-in-part of application Ser. No. 063,685 filed Aug. 6, 1979 as a continuation of application Ser. No. 852,022 filed Nov. 16, 1977 now U.S. Pat. No. 4,164,680.

FIELD OF INVENTION

The present invention relates to diamond implements and in particular to ultraprecision diamond edges and points sometimes referred to as diamond knives. The invention is applicable to monocrystalline diamond implements—made from a single crystal—and to polycrystalline diamond implements—made by molding and bonding under non-oxidizing conditions extremely small diamond or graphite particles—.

BACKGROUND OF THE INVENTION

Since the invention by the applicant more than 25 years ago, diamond cutting tools known as diamond knives have received worldwide acceptance as an unsurpassed cutting tool for the preparation of ultrathin sections for microscopic examination, precision machining and delicate surgical operations and have opened up important new fields.

As disclosed in U.S. Pat. No. 3,060,781, the diamond knife consists of a body of single-crystal diamond which has been cut, abraded and polished by special techniques to yield a wedge-shaped facet that, in the most favorable cases defines a stable and uniform cutting edge having a thickness of only 0.001 to 0.01 micron.

Diamond is the hardest substance known and is composed of carbon atoms arranged in sheets of hexagonal puckered rings stacked one above the other closely together with a spacing of only 2.06 Angstrom units. The strong fourfold covalent bond between the carbon atoms together with a unique symmetrical orientation account for the exceptional properties of the diamond. It is this combination of layered structures in the naturally occurring diamond which makes it possible literally to "dissect out" preformed unit layers of still very strongly bonded sheets to form the desired ultrasharp stable cutting edges of molecular dimensions.

However, the difficulties encountered during the past decades, even by the most skillful workers, in reproducibly making diamond cutting edges of satisfactory quality can be ascribed to two major problems which are:

(1) The inherent complexity of a natural diamond which not only consists of the crystalline carbon layers but also features a large number of other atoms such as nitrogen platelets included in the lattice and making up to 0.3% of the type I diamonds most commonly occurring. There are also numerous associated dislocations and defects in the crystalline diamond lattice. This microscopic complexity of the diamond becomes a preponderant factor in making it difficult to dissect out its unit layers to form a cutting edge.

(2) Up till now all of the abrading and polishing methods utilized are essentially mechanical chipping, fracturing and grinding processes which unavoidably disrupt the periodic crystalline lattice of the diamond. In fact extensive studies by X-ray diffraction, electron diffraction and related polarization optical analysis reveal that the primary ultrasharp diamond knife cutting edge has a so-called mosaic structure not unlike "cracked ice" when compared to the uniform smooth and cohesive "ice sheets" corresponding to the original crystalline diamond lattice.

(3) When the diamond knife is "sharpened" on a diamond wheel charged with fine diamond powder at high speeds, the heat generated may be high enough (e.g. 1200° C.) to "graphitize" the diamond in the presence of atmospheric oxygen thereby chemically modifying and degrading the diamond structure.

As disclosed in U.S. Pat. No. 4,084,942, ultrasharp diamond edges and points which are usable as cutting instruments and as high intensity point sources for the emission of electrons, ions and other radiation are produced from ultrafine diamond powder by the application of high pressure and high temperature in an ultrahigh vacuum or inert atmosphere to avoid oxidation of the diamond powder. As a monocrystalline diamond knife is used as a pattern for the mold used in producing polycrystalline diamond knives from ultrafine diamond powder, any imperfections in the monocrystalline master pattern are carried over into the polycrystalline replica. Moreover, even though ultrafine diamond powder is used in molding polycrystalline diamond knives, the surface obtained is not as uniform, smooth and cohesive as that of the original crystalline diamond lattice.

SUMMARY OF THE INVENTION

It is an object of the present invention to improve the quality, uniformity and reproducibility of ultrasharp diamond edges and points by annealing and glazing the surface of the diamond edge or point so as to smooth out any minute irregularities and that may be present and relieve strain, thereby providing a surface which is extremely smooth and durable.

In accordance with the invention a diamond implement having an ultrasharp edge or point is positioned in a sealed enclosure and the temperature in the enclosure is reduced to at least $-50°$ C. and preferably to a temperature of the order of $-272°$ C. Moreover, the enclosure is evacuated so as to achieve an ultrahigh vacuum of, for example, $10^{-5}$ to $10^{-15}$ Torr. Under these conditions the diamond edge or point is irradiated with an electron microbeam to smooth out any minute irregularities and obtain an atomic smoothness, annealing and glazing of the surface. The term "electron beam" is herein used in a generic sense to include electron or ion beam irradiation.

Instead of or preferably in addition to irradiation of the diamond edge or point with an electron microbeam, the diamond edge or point while at low temperature and under high vacuum is subjected to a controlled jet of highly purified gas to effect an atomic etching and polishing.

Preferably this treatment of the diamond edge or point is carried out in the chamber of an electron microscope. This permits observation of the diamond edge or point at high magnification during processing and control of the irradiation of the jet of highly purified gas in accordance with such observation.

BRIEF DESCRIPTION OF DRAWINGS

The nature, objects and advantages of the invention will be more fully understood from the following description of preferred embodiments in conjunction with the accompanying drawings in which.

DESCRIPTION OF PREFERRED EMBODIMENTS

Figure 1:
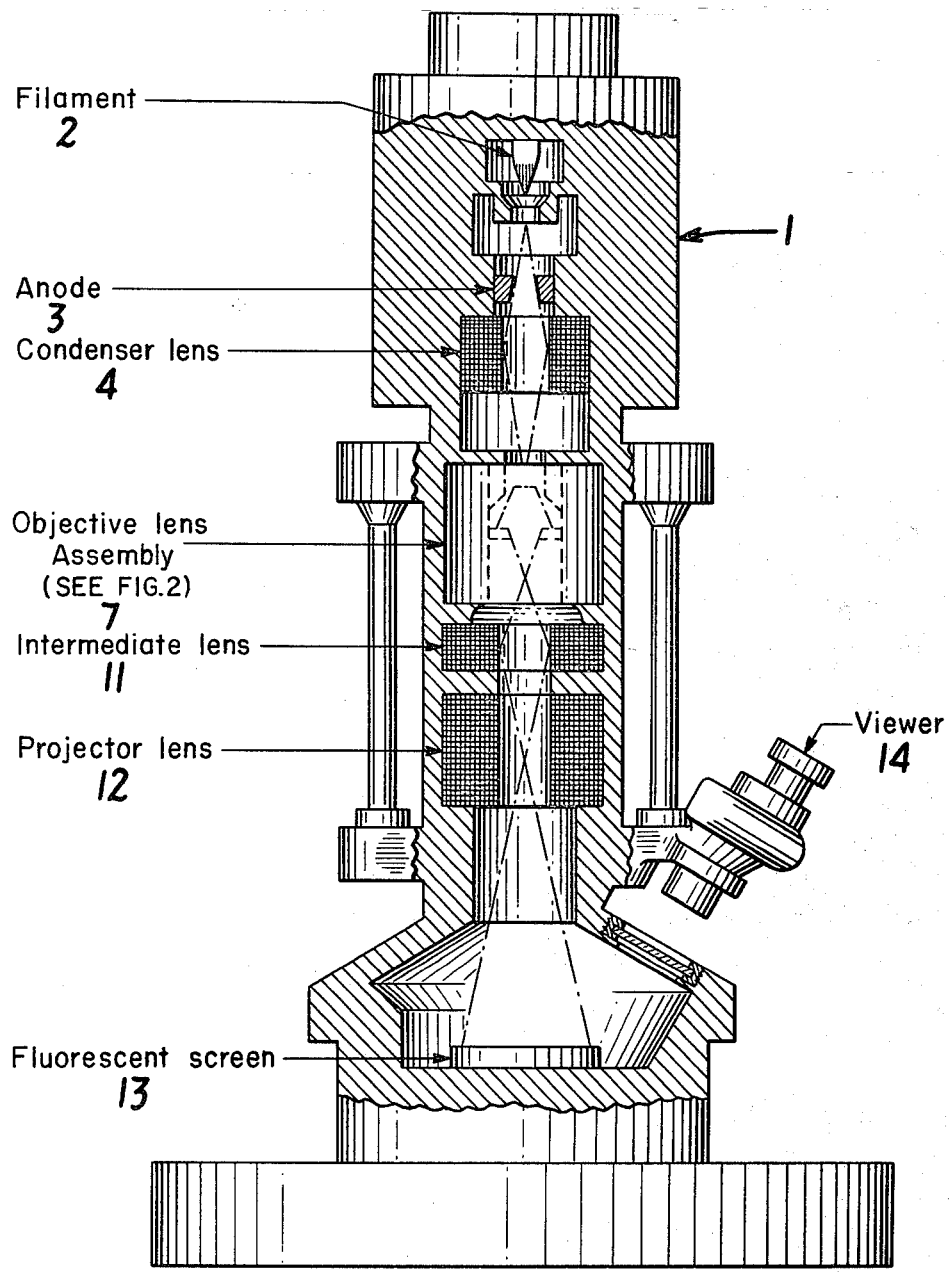
FIG. 1 is a schematic illustration of apparatus for carrying out the invention.

The process in accordance with the present invention is applicable both to monocrystalline and polycrystalline diamond implements. A diamond implement is first made in accordance with the methods disclosed in my prior patents. Thus as described in U.S. Pat. No. 3,060,781, the disclosure of which is incorporated by reference herein, a monocrystalline diamond cutting tool is produced from a single crystal diamond by cleaving the diamond to obtain the approximate tool configuration and then grinding and polishing the surfaces of the diamond defining the cutting edge. For example the diamond, the edge of which is to be sharpened, is fastened to the end of a pivoted lever and advanced towards the surface of a rotating disc covered by a paste containing ultrafine diamond powder. The ultrafine powder used for the grinding and polishing is obtained by means of repeated centrifuging of an aqueous suspension of fine powder. By grinding in this manner a skilled expert may obtain an extremely sharp edge having a thickness of 0.001 to 0.01 micron.

Polycrystalline diamond edges and points may be made by the method described in my U.S. Pat. No. 4,084,942, the disclosure of which is incorporated herein by reference. In accordance with the method disclosed by this patent, ultrasharp diamond edges and points which are usable as cutting instruments and as high intensity point sources for the emission of electrons and other electro-magnetic radiation are produced by preparing and classifying ultrafine diamond powder having a particle size of 10 to 100 Angstroms. Such powder is placed with or without a binder or other additive in a diamond mold defining the ultrafine edge or point to be produced. A pressure of the order of 80 to 90 kb is applied while heating the powder to a temperature of the order of 2400° K. to 2500° K. in an ultrahigh vacuum or inert atmosphere after degassing to avoid oxidation of the diamond powder.

Instead of starting with diamond powder, a polycrystalline diamond implement can be made from ultrafine particles of graphite which are converted to diamond and molded with high temperature and high vacuum in an ultrahigh vacuum or inert gas into a polycrystalline diamond implement of predetermined size and shape as described in my application Ser. No. 063,685 the disclosure of which is incorporated by reference in the present application.

While the process in accordance with the present invention is applicable to precision diamond implements of different sizes and shapes, it will for convenience be described with reference to an implement having an ultrafine cutting edge herein referred to as a diamond knife. After a diamond knife has been prepared as described above, it is checked by electron optical and X-ray diffraction procedures as described in my U.S. Pat. No. 3,447,366 to determine that the cutting edge is extremely uniform and has at least a thickness of 0.001 to 0.01 micron and is properly oriented.

The diamond knife thus prepared and checked is placed in a special holder which can be oriented in a precision goniometer and then introduced into a modified and specially designed cryogenic electron microscope and electron diffraction unit operating at e.g. 10,000 to 200,000 electron volts with a special pointed filament gun and operating in an ultrahigh vacuum of at least $10^{-5}$ to $10^{-8}$ Torr or even better a fully cryogenic vacuum of $10^{-10}$ to $10^{-15}$ Torr.

To assure proper cooling the diamond knife is attached to a special precision controlled "cooling finger" or heat sink and is cooled to cryogenic temperatures ranging from about $-100°$ C. to $-180°$ C. with a controlled liquid nitrogen cryostat. For very critical and precision work, the diamond knife is cooled with a liquid helium stage to a temperature of $-269°$ C. (4.2° Kelvin) or superfluid helium to a temperature of $-271.2°$ C. (1.8° K.). The cooling is continued until stable equilibrium conditions are reached as monitored with very sensitive thermocouples or other heat sensitive devices.

An electron beam having a diameter of about 0.01 micron to about 2 microns and an intensity of the order of 0.1 A/cm$^{-2}$ is now focused onto the diamond edge and by means of special objective lenses, the diamond knife edge is imaged on a viewing screen with a magnification of about 100 to 1,000,000 times. During irradiation of the diamond edge with the electron microbeam, the edge is electron optically observed and the irradiation by the electron microbeam is controlled in accordance with such observation to smooth out any minute irregularities that may be present and to produce an atomic smoothness, annealing and glazing of the diamond edge.

A further feature of the invention is that with the diamond edge subjected to low temperature at low pressure as described above, a precisely controlled jet of highly purified gas, for example water vapor, hydrogen, oxygen, helium, neon, xenon or argon, is introduced precisely along the edge and at controlled partial vapor pressure of the order of $10^{-5}$ to $10^{-6}$ Torr. Preferably the jet of highly purified gas is directed onto the diamond edge while the latter is being irradiated with an electron beam as described above. Under the combined effects of the impinging electron beam and the jet of highly purified gas, especially water vapor, there is obtained an atomic etching and polishing which produces an extremely smooth surface. It has been quantitatively determined that the ionization cross sections of carbon molecules under the effect of the electron beam and adsorbed water vapor results in a number of ionization processes. Thus when the diamond edge is cooled to a temperature of $-100°$ C. to $-269°$ C. there is always a net removal of carbon atoms at a rate varying between 0.1 Angstrom unit to about 3 to 6 Angstrom units per second or 10 to 20 Angstrom units per second depending on the temperature. A removal of about $10^8$ to $10^{16}$ individual carbon atoms can thus be effected by the electron beam under these controlled conditions. This is the equivalent of severing the strong covalent bonds of the diamond crystalline lattice and "stripping" off the puckered sheets of carbon atoms layer-by-layer under direct electron optical observation. This results in the removal of any surface imperfections in the diamond edge. Moreover, by carefully controlled etching in this manner, the radius of the diamond edge can be reduced to, for example, 0.0005 to 0.005 micron. It is also possible to produce other effects as, for example, etching the surfaces of the diamond edge so that they are concave thus producing a hollow-ground knife edge.

During this process the diamond edge is cryogenically cooled and is surrounded by a special liquid nitrogen or liquid helium cold stage in order to "trap" the resulting free radicals and controlling the electron-carbon-atom removal and the glazing and annealing of the surface.

Typical reactions produced by the electron beam upon impinging on the diamond knife involving free radicals, unpaired electron systems, which result from removal of outer electrons of diamond by the impinging electron beam are:

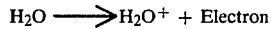

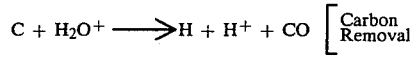

Figure 2:
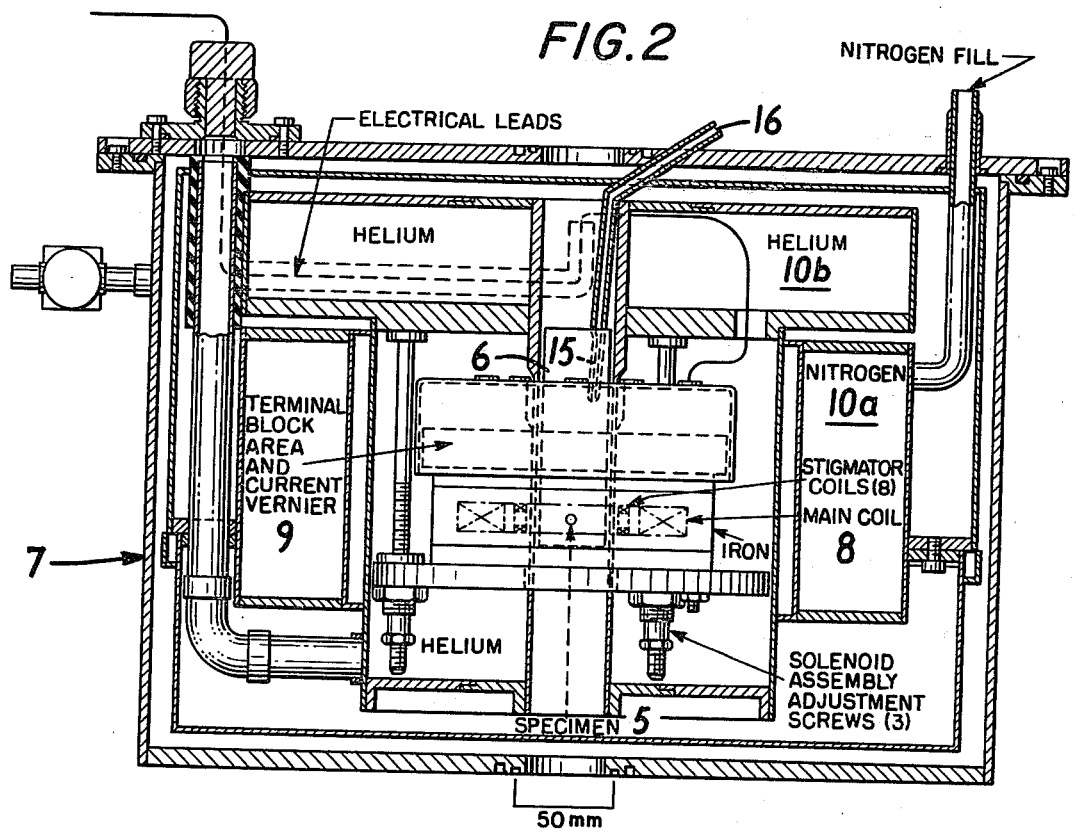
FIG. 2 is a schematic diagram of a superconducting objective lens of special design in liquid helium cold stage assembly modified for adaptation to apparatus shown in FIG. 1.

Apparatus for carrying out the invention as illustrated schematically in FIG. 1 comprises a transmission electron microscope 1 having a sealed enclosure or chamber which is evacuated by a vacuum manifold connected to a diffusion or ion pump. At the top of the electron microscope there is provided an electron gun comprising a filament 2 and anode 3. The electron beam is focused by a condenser lens 4 onto the specimen 5 which is held by an ultraprecision micromanipulator assembly 6 associated with a super-conducting objective lens 7. As shown in FIG. 2, the superconducting objective lens 7 comprises a main coil 8, a vernier coil 9, an annular chamber 10a to which liquid nitrogen is supplied and a chamber 10b to which liquid helium is supplied. The ultraprecision micromanipulator 6 provides for microprecision 3-dimensional positioning of the diamond knife 5, while being integrated with pole pieces of different types. Thus the pole pieces used may be (a) of conventional iron type including short focal length (f=1.5 mm) singlefield condenser-objective pole pieces of iron or dysprosium, (b) trapped-flux miniature lenses of Nb$_3$Sn of Fernandez-Moran type or (e) shielding lenses of Dietrich type modified for the superconducting objective lens. For maximum flexibility, the entire assembly can be removably positioned in the central bore of the superconducting lens as illustrated schematically in FIG. 2. The objective lens 7, an intermediate lens 11 and a projector lens 12 focus an image of the diamond knife on a flourescent screen 13 where it can be viewed through a window by an optical viewer 14. The diamond knife can thus be electron optically observed while being irradiated by an electron microbeam from the electron gun 2, 3. A tube 16 provided with a nozzle 15 is used for directing a controlled jet of water vapor or other gas onto the diamond knife. Means is provided for effecting relative movement between the diamond edge and the jet movement of the diamond edge or movement of the nozzle 15 or both. Water vapor or other gas is precisely controlled through valves in supply tube 16.

Since the process can be directly observed with the same equipment used to implement or "machine" the edge, there is provided the most sensitive and controllable process conceivable permitting selective removal of single carbon atoms from the diamond site or sheets of carbon atoms from the extended edge with a precision of 0.005 to 0.0001 micron.

The process is ideally suited for automatic computer (microprocessor) controlled scanning of the electron beam. When using ions instead of electrons, for example argon ions in a low energy range of 500 to 1000 electron volts, surface atoms of the diamond edge can actually be "sputtered" off by breaking selectively the fourfold covalent bonds of the diamond lattice.

Moreover, by using photolithographic techniques combined with selective masking, it is possible to direct the treatment to preselected areas. Thus by using special photoresist and photolithographic masking techniques, the etching, smoothing and annealing of the surface can be confined to selected areas defined by the mask. In this manner it is possible to produce, for example, a hollow-ground blade or to provide minute pockets or cuvettes in the facet surface of the diamond edge.

Figures 3, 4:
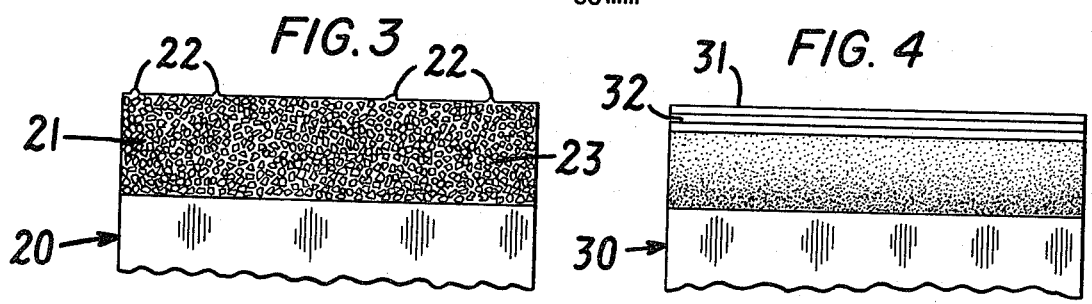
FIG. 3 is an enlarged schematic side view of a prior art monocrystalline diamond knife.
FIG. 4 is an enlarged schematic side view of a diamond knife produced in accordance with the present invention.

Thus, starting with good diamond knives prepared as described above, the process in accordance with the invention makes it possible to consistently produce extremely uniform cutting edges of a radius of 0.0005 to 0.005 micron and lengths of several millimeters. An interesting and significant characteristic of diamond knife edges produced by the method of the present invention is that the edge becomes transparent as observed in a transmission electron microscope. This contrasts with prior diamond knives in which the edge is opaque. This is illustrated by comparison with FIG. 3 which shows a prior diamond knife and FIG. 4 which shows a diamond knife produced by the method of the present invention. The prior diamond knife 20 as shown in FIG. 3 under high magnification has an opaque edge 21 on which there are minute projections 22 formed by small clusters of carbon atoms or impurities. The surface 23 of the diamond knife is somewhat rough as a result of the grinding and polishing process by which the diamond knife was made.

Figure 5:
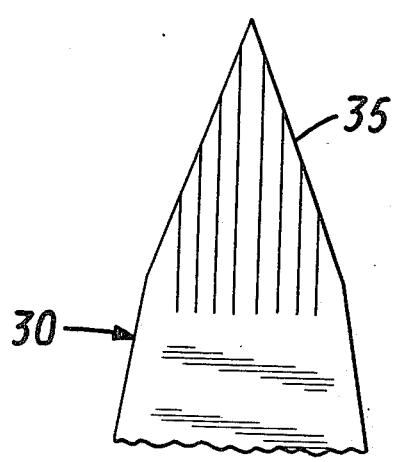
FIG. 5 is an enlarged schematic end view of a diamond knife made in accordance with the present invention.
Figure 6:
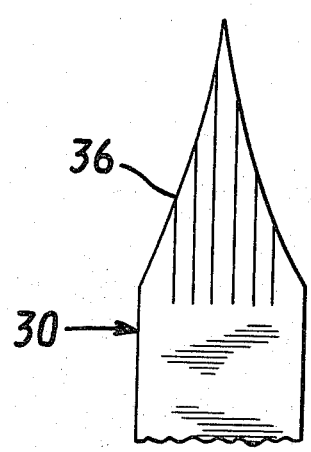
FIG. 6 is a view similar to FIG. 5 but showing a hollow-ground knife.

In a diamond knife 30 made in accordance with the present invention as illustrated in FIG. 4, the edge 31 is straight and uniform and free from projecting particles. An edge portion 32 is transparent to an electron beam and forms in effect a "window". The surfaces defining the diamond edge are atomically smooth and annealed and have a glazed appearance. The diamond knife edge may be defined by planar facet surfaces 35 as illustrated schematically with high magnification in FIG. 5 or the surfaces 36 may be concave as illustrated in FIG. 6 in order to form a hollow-ground knife edge.

While the invention has been described with reference to the production of diamond knives, it will be understood that the process of the present invention is also applicable to the production of multiple points, serrated or comb cathodes, complex forms for integrated microelectronic componentry, particularly for ultraprecise, ultraminiaturized superconducting electronic systems, ultraminiaturization machining techniques, molecular sectioning of nucleic acids, enzymes and other macromolecular systems, microsurgery, etc. With suitable masking and the described electron optical and cryogenic methods any desired shape or configuration can be obtained and directly visualized at the molecular and atomic levels. The invention thus provides precision diamond implements which represent a significant improvement over those heretofore available.

What is claimed is:

1. A method of making ultrasharp diamond edges and points which comprises forming a diamond edge or point having a radius less than 0.01 micron, positioning said diamond edge or point in a sealed enclosure, reducing the temperature in said enclosure to a temperature in the range of $-50°$ C. to $-272°$ C., and the pressure in said enclosure to a pressure of the order of $10^{-5}$ Torr to $10^{-15}$ Torr and while said diamond edge or points is subjected to said reduced temperature and pressure, irradiating said diamond edge or point with an electron microbeam to smooth out minute irregularities and obtain an atomic smoothness, annealing and glazing.

2. A method of making ultrasharp diamond edges or points which comprises forming a diamond edge or point having a radius of less than 0.01 micron, positioning said diamond edge or point in a sealed enclosure, reducing the temperature in said enclosure to a temperature in the range of $-50°$ to $-272°$ C. and the pressure in said enclosure to a pressure of the order of $10^{-5}$ Torr to $10^{-15}$ Torr and while said diamond edge or point is subjected to said reduced temperature and pressure, irradiating said diamond edge or point with an electron beam and subjecting said diamond edge or point to a controlled jet of highly purified gas to effect an atomic etching and polishing.

3. A method according to claim 1 or 2, in which said diamond edge or point is formed by cutting and grinding a monocrystalline diamond to provide said edge or point.

4. A method according to claim 1 or 2, in which said diamond edge or point is formed by molding and bonding ultrafine diamond powder into a body having said edge or point.

5. A method according to claim 1, in which said enclosure comprises the chamber of an electron microscope, and in which said diamond edge or point is observed through said electron microscope during the irradiation of said diamond edge or point with an electron microbeam and the irradiation of said diamond edge or point is controlled in accordance with such observation.

6. A method according to claim 2, in which said enclosure comprises the chamber of an electron microscope, and in which said diamond edge or point is observed through said electron microscope during the subjecting of said diamond edge or point to a controlled jet of highly purified gas and said jet is controlled in accordance with such observation.

7. A method according to claim 1, in which said irradiation of said diamond edge or point with an electron microbeam is controlled to remove carbon molecules from the surface of said diamond edge or point to reduce the radius of said diamond edge or point to less than 0.005 micron.

8. A method according to claim 2, in which said jet of highly purified gas is controlled to etch the surface of said diamond point or edge to reduce the radius of said edge or point to less than 0.005 micron.

9. A method according to claim 1, further comprising selectively masking the surface of said diamond edge or point or facet planes to confine the effect of said irradiation to a well-defined area.

10. A method according to claim 2, further comprising selectively masking the surface of said diamond edge or point or facet planes to confine the effect of said irradiation and controlled jet of highly purified gas to a well-defined area.

11. An ultrasharp diamond edge or point made by the method of claim 1 and having at least selected areas of the surface of said edge or point atomically smooth annealed and glazed.

12. An ultrasharp diamond edge or point according to claim 11, having a radius less than 0.005 micron.

13. An ultrasharp diamond edge or point made by the method of claim 2, and having at least selected areas of the surface of said edge or point or facet planes atomically etched and polished.

14. An ultrasharp diamond edge or point according to claim 13, having a radius less than 0.005 micron.

15. An ultrasharp diamond edge or point made by the method of claim 10, and having at least selected areas of the surface of said edge or point or facet planes provided with ultraprecision minute pockets, microchambers or microcuvettes of predetermined configuration and dimensions.

* * * * *